_United States Patent_ [19]

Inana

[11] Patent Number: 5,315,334
[45] Date of Patent: May 24, 1994

[54] LIQUID CRYSTAL FINDER/PROJECTOR FOR VIDEO CAMERA

[75] Inventor: Katsuya Inana, Tokyo, Japan

[73] Assignee: Fuji Photo Film Co., Ltd., Kanagawa, Japan

[21] Appl. No.: 850,896

[22] Filed: Mar. 13, 1992

[30] Foreign Application Priority Data

Mar. 18, 1991 [JP] Japan .................... 3-052728

[51] Int. Cl.5 .............. G03B 13/02; H04N 5/30; H04N 5/04; H04N 5/74
[52] U.S. Cl. ...................... 354/219; 348/333; 348/373; 348/766; 348/789
[58] Field of Search .............. 354/219, 223; 358/224, 358/231, 229, 254

[56] References Cited

U.S. PATENT DOCUMENTS

| | | | |
|---|---|---|---|
| 4,816,860 | 3/1989 | Iida et al. ............... | 354/402 |
| 4,873,576 | 10/1989 | Hattori et al. ........... | 358/224 |
| 4,959,729 | 9/1990 | Fukuda et al. ........... | 358/224 X |
| 4,969,046 | 11/1990 | Sugimoto et al. ........ | 358/254 |

FOREIGN PATENT DOCUMENTS 1-115371 8/1989 Japan .

_Primary Examiner_—Michael L. Gellner
_Assistant Examiner_—J. K. Han
_Attorney, Agent, or Firm_—Sughrue, Mion, Zinn, Macpeak & Seas

[57] ABSTRACT

A liquid crystal finder attached video camera whose liquid crystal finder is usable as a liquid crystal projector. This liquid crystal finder attached video camera is composed of a video camera body, a liquid crystal view finder unit having a transmission-type liquid crystal display portion fixed thereto and an eyepiece portion turnable between a picture-taking position behind the transmission-type liquid crystal display portion and a projector position ahead of the transmission-type liquid crystal display portion, the front face of the liquid crystal view finder unit being detachably mounted on a battery attachment face at the back of the video camera body, and the back face of the liquid crystal view finder unit being formed with a battery attachment face, and a light unit having a light facing ahead at the upper portion thereof, the front face of the light unit being detachably mounted on the battery attachment face at the back of the video camera body, and the back face of the light unit being formed with a battery attachment face.

4 Claims, 9 Drawing Sheets

LIQUID CRYSTAL FINDER/PROJECTOR FOR VIDEO CAMERA

BACKGROUND OF THE INVENTION

1. Field of the Invention

This invention relates to a liquid crystal finder attached video camera, and more particularly, to a liquid crystal finder attached video camera in which a transmission-type liquid crystal display portion of a liquid crystal view finder is used as a part of a projector.

2. Description of the Related Art

There is disclosed a liquid crystal view finder attached video camera having a function as a projector by using a liquid crystal display portion (Japanese Utility Model Laid-Open No. Hei 1-115371). In this video camera, a light source for projection is disposed behind a transmission-type liquid crystal display portion of a liquid crystal view finder, and light emitted from the light source passes the liquid crystal display portion and enters an optical system lens of the liquid crystal view finder. Then, an image in the liquid crystal display portion enlarged by the optical system lens is projected onto a screen or the like.

However, if the light for projection is radiated from behind the liquid crystal display portion, since an image taken from behind the liquid crystal display portion is projected onto the screen or the like, it is necessary to reverse the image in the liquid crystal display portion in picture taking in order to make the image accord with an image taken from the front of the liquid crystal portion, that is, a normal image.

SUMMARY OF THE INVENTION

With the above problem in view, an object of the present invention is to provide a liquid crystal finder attached video camera capable of projecting a normal image onto a screen or the like without reversing an image in a liquid crystal display portion.

In order to achieve the above object, there is provided a liquid crystal finder attached video camera comprising, a video camera body, a liquid crystal view finder unit having a transmission-type liquid crystal display portion fixed thereto and an eyepiece portion turnable between a picture-taking position behind the transmission-type liquid crystal display portion and a projector position ahead of the transmission-type liquid crystal display portion, the front face of the liquid crystal view finder unit being detachably mounted on a battery attachment face at the back of the video camera body, and the back face of the liquid crystal view finder unit being formed with a battery attachment face, and a light unit having a light facing ahead at the upper portion thereof, the front face of the light unit being detachably mounted on the battery attachment face at the back of the video camera body, and the back face of the light unit being formed with a battery attachment face. When the light unit is used as a video light, the eyepiece portion is turned to the picture-taking position and the light unit is mounted between the video camera body and the liquid crystal view finder unit, and when the light unit is used as a projector light source, the eyepiece portion is turned to the projector position and the liquid crystal view finder unit is mounted between the video camera body and the light unit.

According to the present invention, in the liquid crystal view finder unit, the transmission-type liquid crystal display portion is fixed, the eyepiece portion is movable between the picture-taking position behind the liquid crystal display portion and the projector position ahead of the liquid crystal display portion, the front face of the finder unit is detachably mounted on the battery attachment face at the back of the video camera body, and a battery can be attached to the back face of the finder unit. The front face of the light unit is detachably mounted on the battery attachment face at the back of the video camera body, a battery can be attached to the back face of the light unit, and the light unit is provided with a light facing ahead at the upper portion thereof.

In picture taking, the eyepiece portion is held in the picture-taking position, the light unit is mounted between the video camera body and the liquid crystal view finder unit to be used as a video light, and an image of an object displayed in the liquid crystal display portion is led to the eyepiece portion as a normal image taken from the front of the liquid crystal display portion.

When the video camera is used as a projector, the eyepiece portion is held in the projector position, and the liquid crystal view finder unit is mounted between the video camera body and the light unit so that the light unit is used as a light source of the projector. Since an image is projected onto a screen disposed ahead of the liquid crystal display portion by radiating light of the light unit from behind the liquid crystal display portion, that is, the right side of the liquid crystal display portion, the projected image becomes a normal image taken from the front of the liquid crystal display portion.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DESCRIPTION OF THE PREFERRED EMBODIMENTS

Detailed description will hereunder be given of the preferred embodiment of VIDEO CAMERA WITH LIQUID CRYSTAL FINDER according to the present invention with reference to the accompanying drawings.

Figure 1:
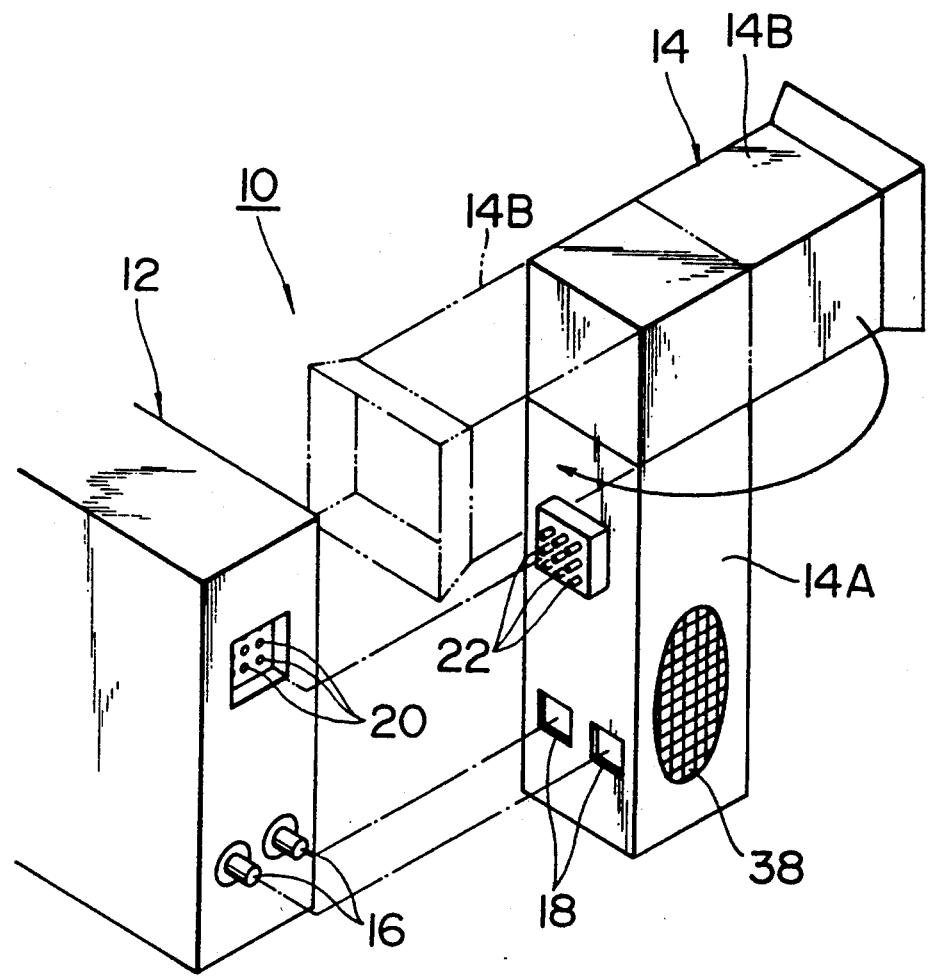
FIG. 1 is an enlarged view of the principal part of a liquid crystal finder attached video camera according to an embodiment of the present invention.

As shown in FIG. 1, a video camera 10 consists of a camera body 12 and a view finder unit 14 which is detachable from a first battery attachment face at the back of the camera body 12. When the view finder unit 14 is attached to the back of the camera body 12, terminals 16 and 16 of the camera body 12 and terminals 18 and 18 of the view finder unit 14 are connected. In this case, since the terminals 16 and 16 are projected by the urging force of an unillustrated spring, when the terminals 16 and 16 are brought into contact with the terminals 18 and 18, the terminals 16 and 16 are retracted in the camera body 12 against the urging force of the spring. A power supply in the camera body 12 is thereby connected to the view finder unit 14. Furthermore, the terminals 16 and 16 are connecting the terminals 18 and 18, and connector pins 20, 20. . . of the camera body 12 for outputting a video signal is fitted into a connector receivers 22, 22. . . in the view finder unit 14 for inputting the video signal, thereby connecting the connector pins 20, 20... and the connector receivers 22, 22. . .

Figure 2:
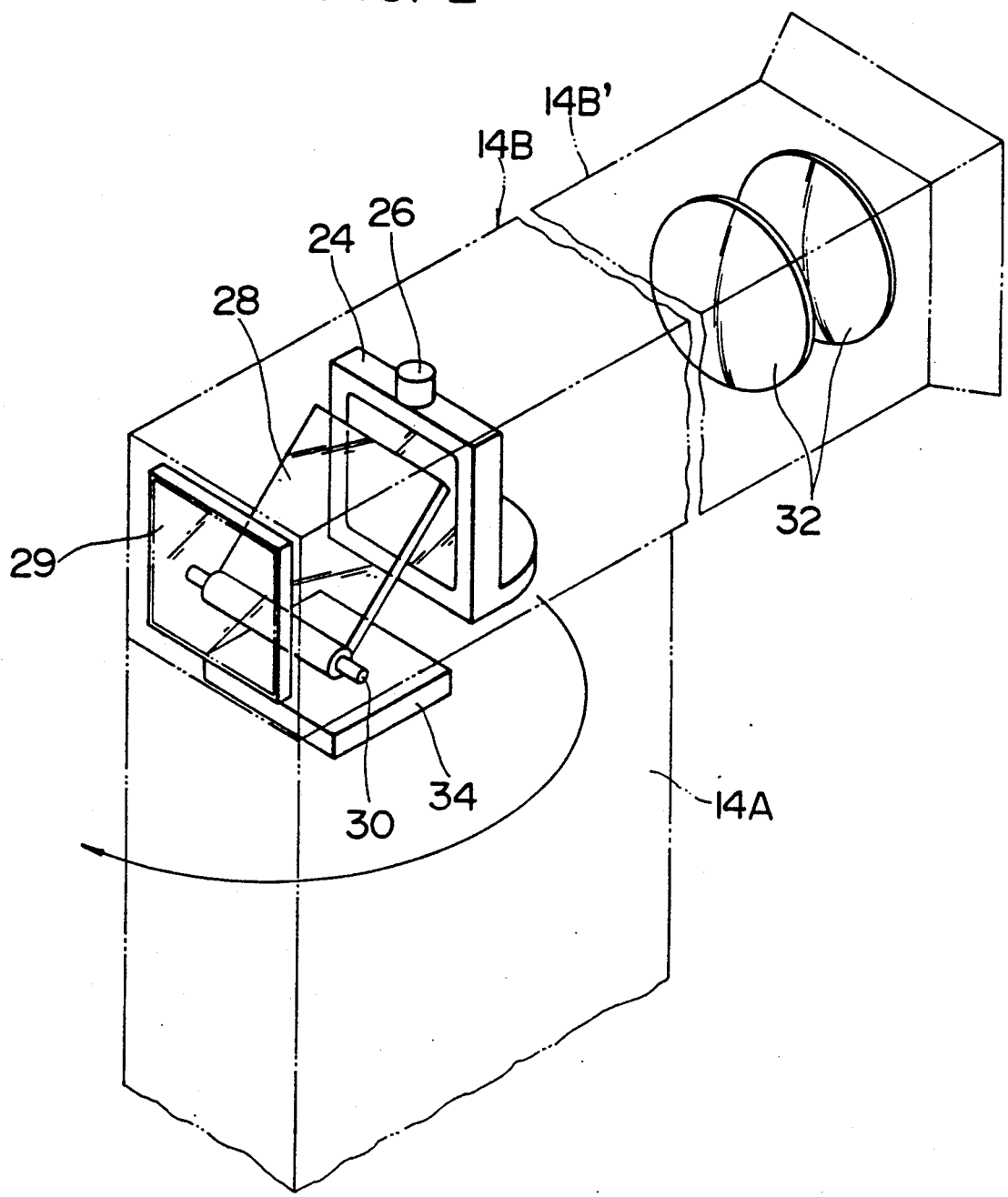
FIG. 2 is an enlarged view of the principal part of the liquid crystal finder attached video camera.

The view finder unit 14 is composed of an attachment portion 14A and a finder portion 14B. The finder portion 14B is turnable on the attachment portion 14A through 180° between a finder position (a position indicated by a solid line shown in FIG. 1) and a projector position (a position indicated by an imaginary line shown in FIG. 1). In other words, as shown in FIG. 2, a finder frame 14B' of the finder portion 14B is formed with an unillustrated concave portion in which a shaft 26 formed at the top of a transmission-type liquid crystal display portion 24 is fitted. The liquid crystal display portion 24 is fixed to the top of the attachment portion 14A. A magic mirror 28 is rotatably supported behind the liquid crystal display portion 24 in the finder frame 14B' through a shaft 30. The magic mirror 28 is urged by a spring (not shown) toward the liquid crystal display portion 24, and held at an angle of approximately 45° when the finder portion 14B is set in the finder position or the projector position. A cover glass 29 disposed behind the magic mirror 28 covers the back end of the finder frame 14B' Furthermore, eyepieces 32 and 32 are arranged in the front of the liquid crystal display portion 24 in the finder frame 14B', and the front end of the finder frame 14B' is open.

Therefore, for example, if the finder frame 14B' is turned on the shaft 26 from the finder position to the projector position in the direction of the arrow, since the side of the liquid crystal display portion 24 and the top of the magic mirror 28 are brought into contact with each other, the magic mirror 28 stands up from the position at an angle of approximately 45° against the urging force of the spring. Thus, when the finder frame 14B' is turned from the finder position to the projector position, or from the projector position to the finder position, the magic mirror 28 can avoid the fixed liquid crystal display portion 24.

Figure 3:
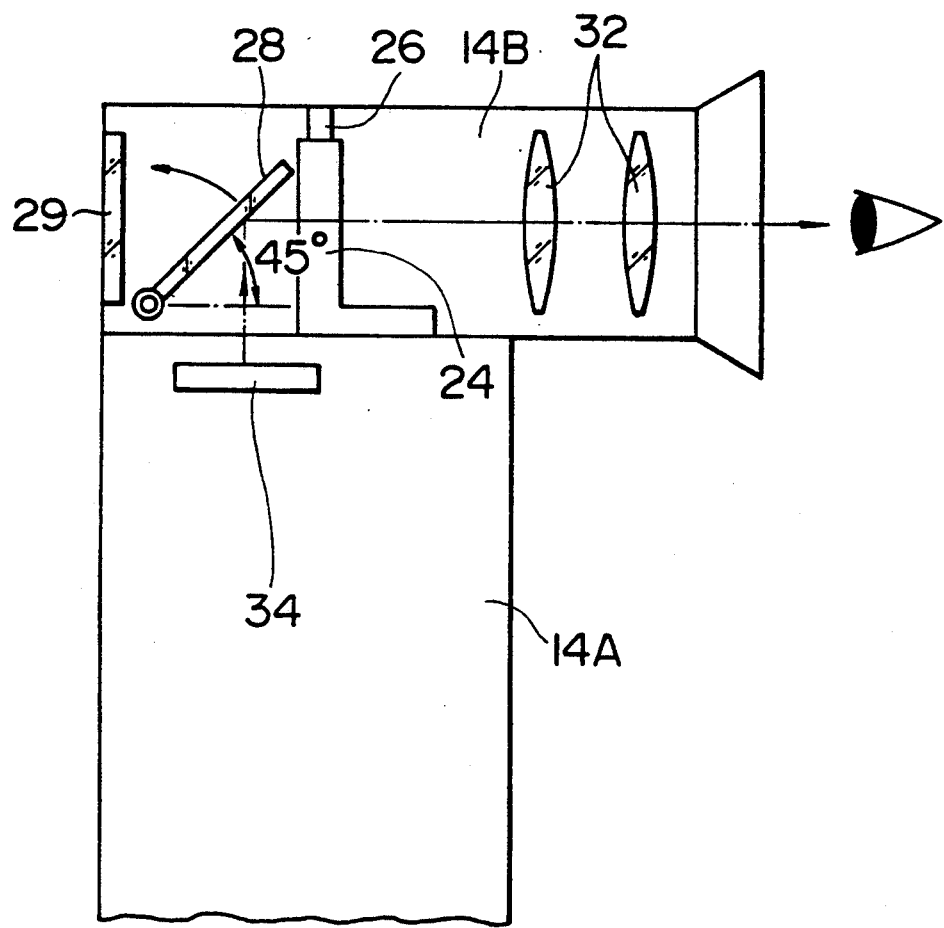
FIG. 3 is a side view of the liquid crystal finder attached video camera.

As shown in FIG. 3, a back light 34 is disposed at the top of the attachment portion 14A. Light emitted from the back light 34 is reflected by the magic mirror 28, passed through the transmission-type liquid crystal display portion 24, and led to an eyepiece portion through the eyepieces 32 and 32. Therefore, if a picture is taken by the video camera of the present invention, when the finder portion 14B is set in the finder position and the light from the back light 34 is radiated to the back face of the transmission-type liquid crystal display portion 24, an image displayed in the liquid crystal portion 24 is led to the eyepiece portion through the eyepieces 32 and 32.

Figure 4:
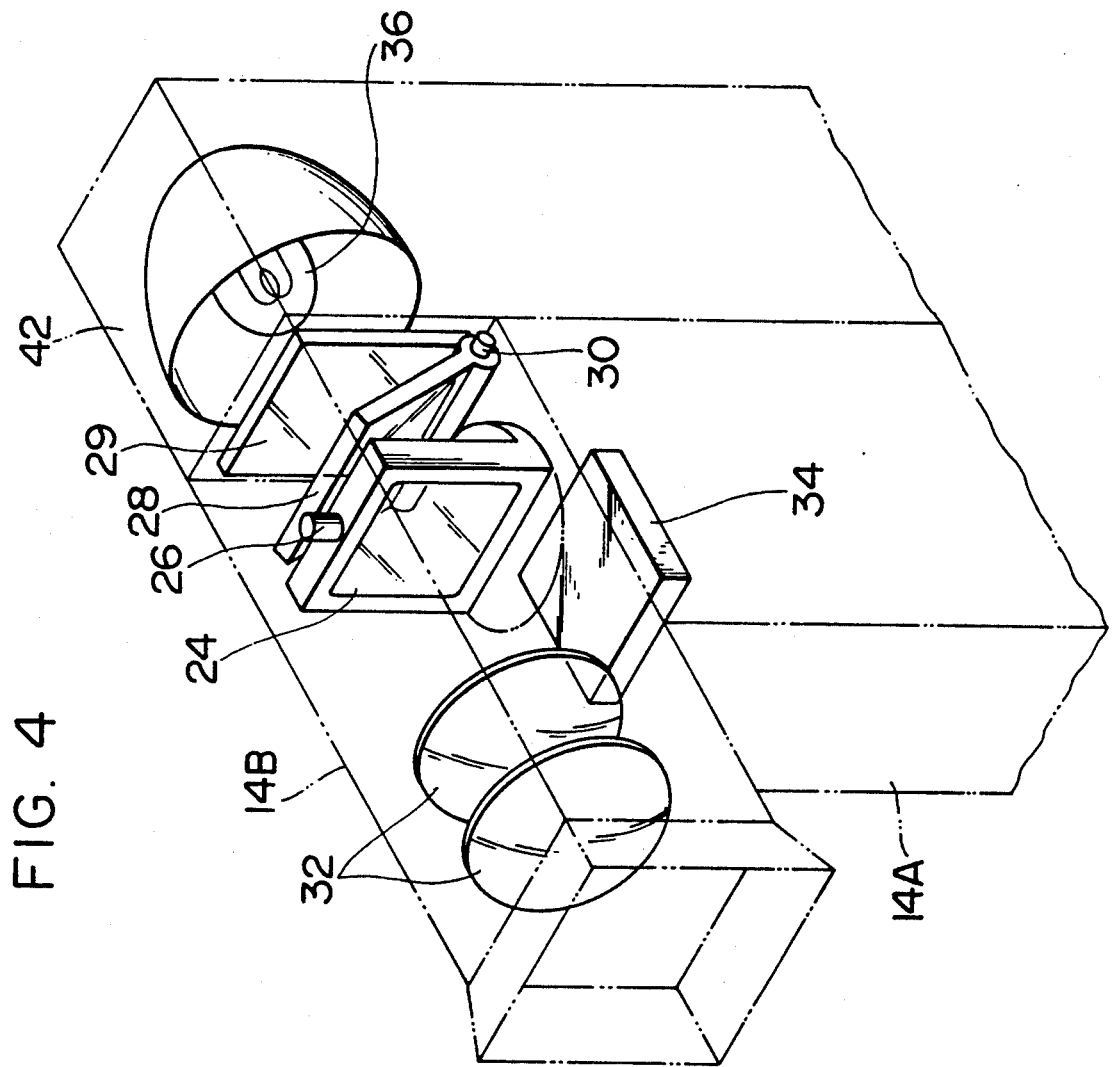
FIG. 4 is an enlarged view of the principal part of the liquid crystal finder attached video camera.
Figure 5:
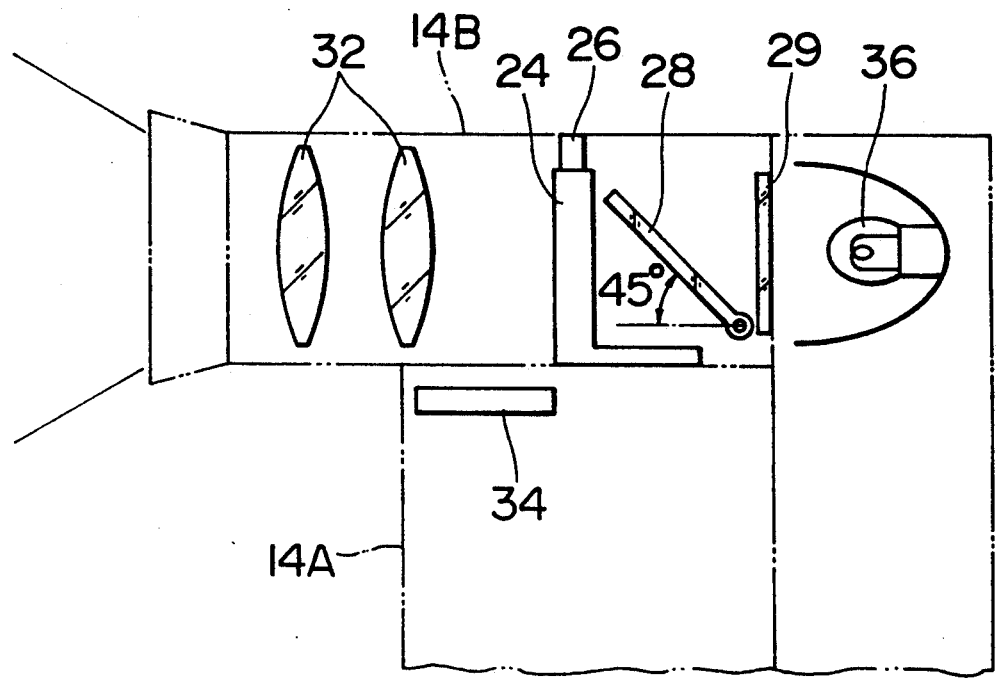
FIG. 5 is a side view of the liquid crystal finder attached video camera.

On the other hand, if the video camera of the present invention is used as a projector, when the finder portion 14B is set in the projector position as shown in FIGS. 4 and 5, light from a light 36 of a video light unit 42 is passed through the cover glass 29 and the magic mirror 28, and radiated onto the surface of the transmission-type liquid crystal display portion 24. The radiated light is passed through the liquid crystal display portion 24, led to the eyepiece portion through the eyepieces 32 and 32, and radiated to a screen 33 shown in FIG. 8. Thus, the image displayed in the liquid crystal display portion 24 is projected onto the screen 33 without being reversed. In this case, the sound is output from speakers 38 and 38 located on both sides of the attachment portion 14A.

Figure 6:
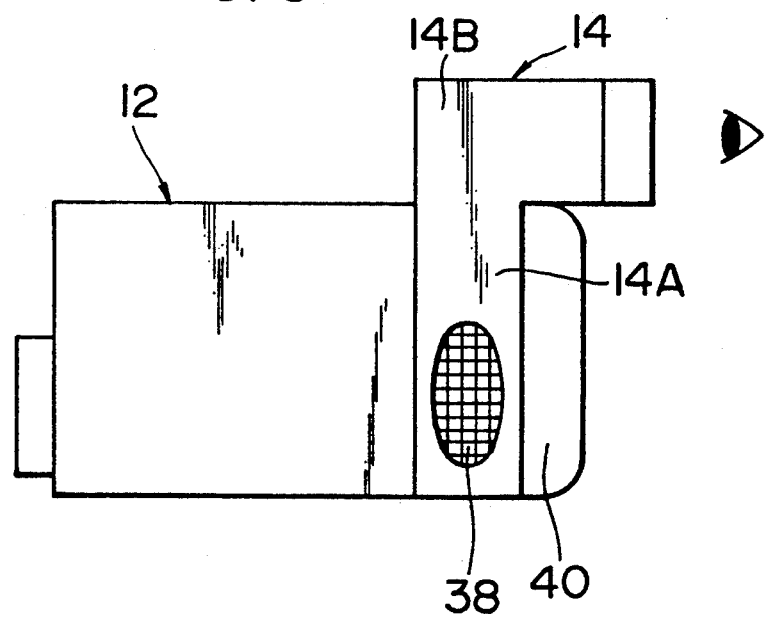
FIG. 6 is a side view showing the picture taking state of the liquid crystal finder attached video camera.
Figure 7:
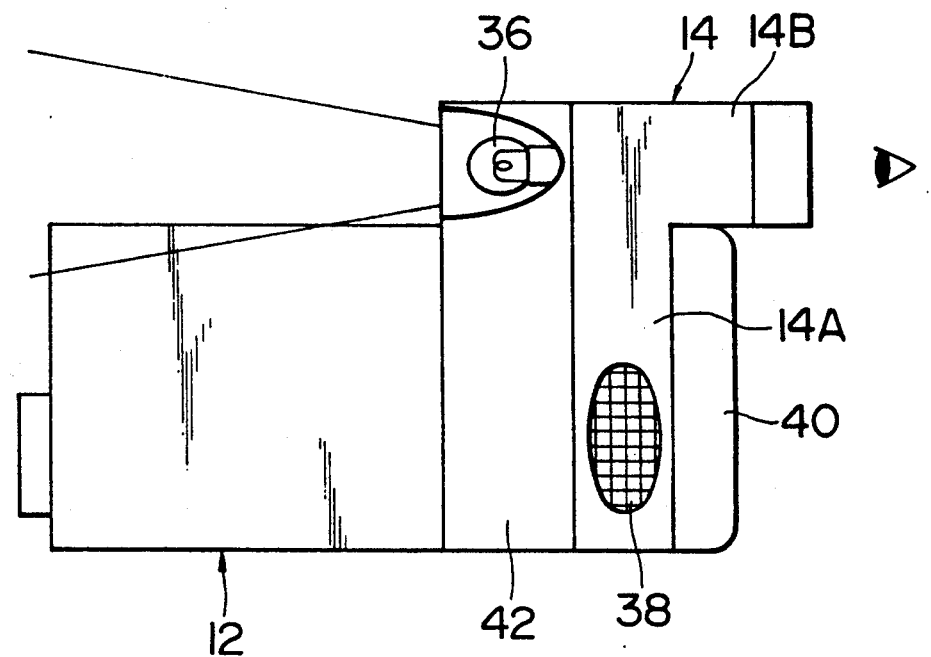
FIG. 7 is a side view showing the picture taking state of the liquid crystal finder attached video camera.

FIG. 6 is a side view showing the finder state of the liquid crystal finder attached video camera according to the present invention. A battery 40 is attached to a second battery attachment face of the view finder unit 14 in a well-known attachment manner. Referring to FIG. 7, the video light unit 42 is inserted between the camera body 12 and the view finder unit 14 shown in FIG. 6. The light unit 42 and the camera body 12, and the light unit 42 and the view finder unit 14 are respectively connected in a well-known attachment manner. In other words, the light unit 42 is attached to the first battery attachment face of the camera body 12, and the view finder unit 14 is attached to a third battery attachment face of the light unit 42.

Figure 8:
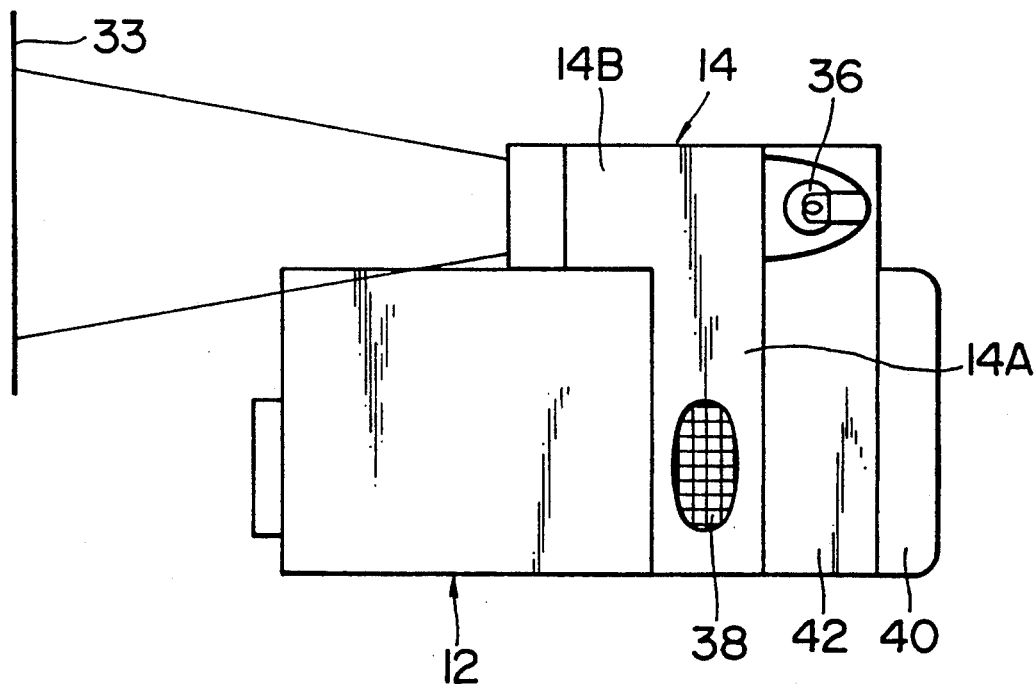
FIG. 8 is a side view showing the state in which the liquid crystal finder attached video camera is used as a projector.

Referring to FIG. 8, the view finder unit 14 of the video camera 10 is set in the projector position, and the light unit 42 is attached to the back face of the view finder unit 14. Thereby, light from the light 36 of the light unit 42 radiates diffused light of an image from the eyepiece portion of the finder portion 14B of the view finder unit 14 through the finder portion 14B as described above.

Figure 9:
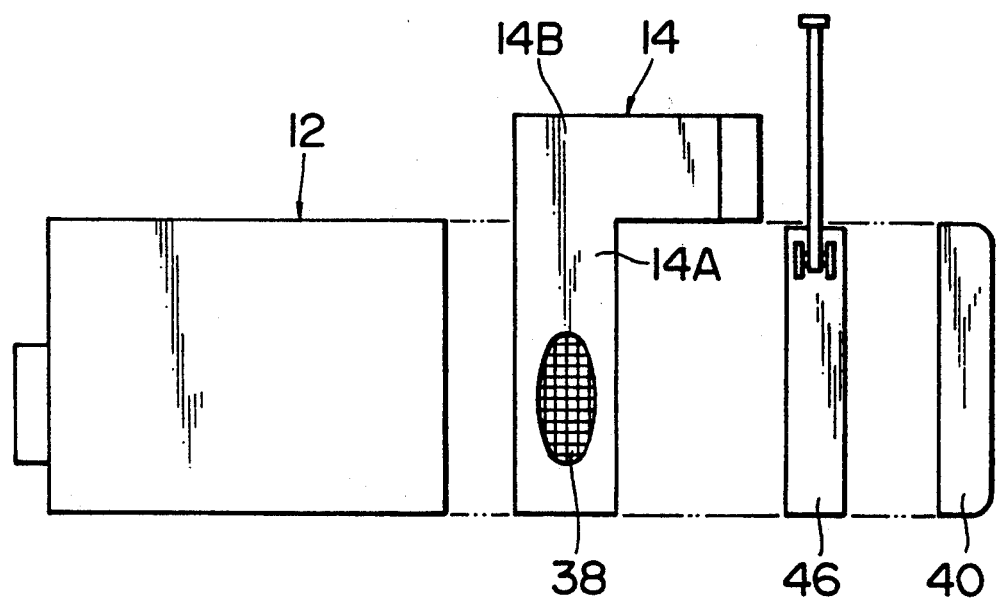
FIG. 9 is a side view showing the state in which the liquid crystal finder attached video camera is separated.
Figure 10:
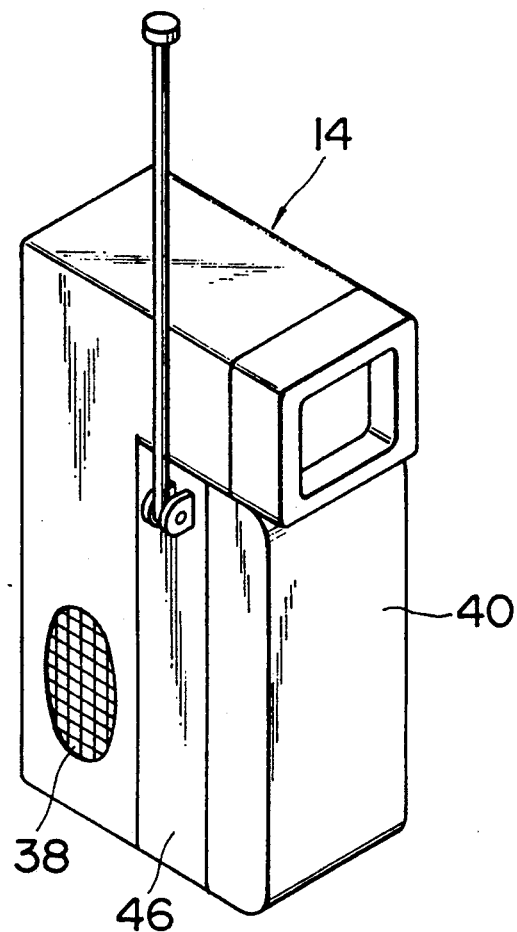
FIG. 10 is a perspective view showing the state in which the liquid crystal finder attached video camera is used as a small television.

As shown in FIGS. 9 and 10, it is possible to separate the view finder unit 14 from the camera body 12, attach the view finder unit 14 to a television (TV) tuner unit 46, input a video signal form the TV tuner unit 46 to the view finder unit 14, and use the view finder unit 14 as a small TV 48.

Figure 11:
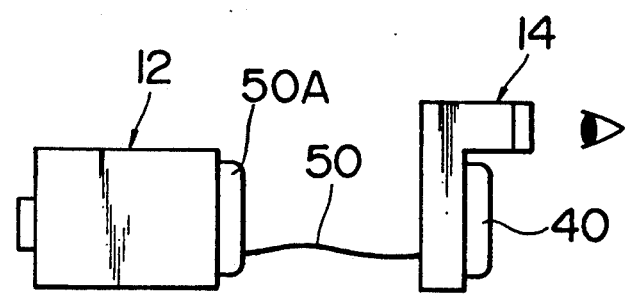
FIG. 11 is a side view showing the state in which the liquid crystal finder attached video camera is divided into a camera body and a finder unit to be used as a video camera.
Figure 12:
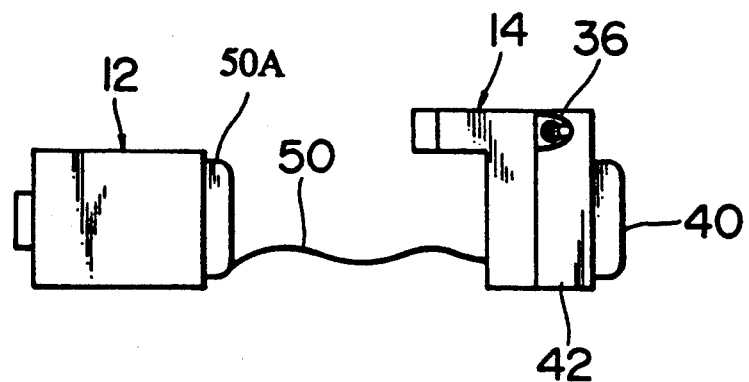
FIG. 12 is a side view showing the state in which the liquid crystal finder attached video camera is divided into a camera body and a finder unit to be used as a projector.

Furthermore, picture taking can be performed by connecting the video signal input terminal 22 of the view finder unit 14 and the video signal output terminal 20 of the camera body 12 through a cord 50 as shown in FIG. 11. When the video camera is used as a projector, as shown in FIG. 12, it is also possible to separate and connect the view finder unit 14 and the camera body 12 through the cord 50. In FIGS. 11 and 12, reference numeral 50A denotes a coupler for connecting the cord 50 to the camera body 12.

Figure 13:
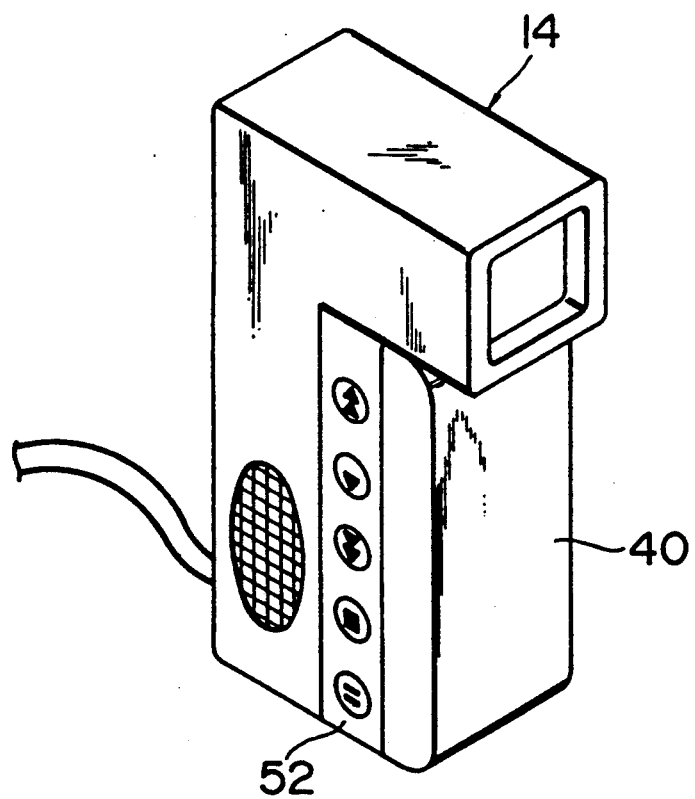
FIG. 13 is a perspective view showing the state in which a remote control unit is mounted in a finder unit of the liquid crystal finder attached video camera.

If the view finder unit 14 and the camera body 12 are separated, a remote control unit 52 may be attached to the view finder unit 14 to form a remote control system as shown in FIG. 13.

As described above, according to the liquid crystal finder attached video camera of the present invention, since an image of an object displayed in the liquid crystal display portion of the liquid crystal view finder unit is led to the eyepiece portion in such a state as seen from the front of the liquid crystal portion in picture taking by the video camera, a normal image can be obtained.

When the video camera is used as a projector, a normal image seen from the front of the liquid crystal display portion can be also projected onto a screen or the like without being reversed.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A liquid crystal finder attached video camera, comprising:
    a video camera body having a first battery attachment face formed at the back thereof and a video output terminal for outputting a video signal, wherein on said first battery attachment face a battery may be detachably mounted;
    a liquid crystal view finder unit having a front face which may be detachably mounted on said first battery attachment face and a back face formed with a second battery attachment face on which said battery may be detachably mounted, said liquid crystal view finder unit comprising a video input terminal for inputting the video signal from said video output terminal, transmission-type liquid crystal display means for displaying an image based on the video signal input through said video input terminal, an eyepiece for magnifying the image displayed by said transmission-type liquid crystal display means, and a turning mechanism for turning said eyepiece between a finder position behind said transmission-type liquid crystal display means and a projector position ahead of said transmission-type liquid crystal display means; and
    a light unit having a front face which may be detachably mounted on said first or second battery attachment face, a back face formed with a third battery attachment face on which said front face of said liquid crystal view finder unit may detachably be mounted, and a light facing ahead in the upper portion thereof,
    wherein said eyepiece is turned to said finder position and said light unit is mounted between said video camera body and said liquid crystal view finder unit so as to use said light unit as a video light, and said eyepiece is turned to said projector position and said liquid crystal view finder unit is mounted between said video camera body and said light unit so as to use said light unit as a projector light source.

2. A liquid crystal finder attached video camera according to claim 1, wherein said liquid crystal view finder unit comprises a magic mirror disposed with an inclination of approximately 45° in a position facing said eyepiece through said transmission-type liquid crystal display means, a back light for illuminating said transmission-type liquid crystal display means with light reflected by said magic mirror, and a window portion for passing illumination light from said light unit through said magic mirror and making the illumination light incident on said transmission-type liquid crystal display means.

3. A liquid crystal finder attached video camera according to claim 1, wherein said liquid crystal view finder unit is used as a small TV by attaching a TV tuner to said liquid crystal view finder unit and inputting a video signal from said TV tuner to said liquid crystal view finder.

4. A liquid crystal finder attached video camera according to claim 1, wherein said video camera body is remotely controlled by attaching a remote control unit to said liquid crystal view finder unit, separating said liquid crystal view finder unit from said first battery attachment face of said video camera body, and connecting said video output terminal and said video input terminal through a cord.

* * * * *